United States Patent [19]

Kolakowski et al.

[11] 4,336,236
[45] Jun. 22, 1982

[54] DOUBLE PRECIPITATION REACTION FOR THE FORMATION OF HIGH PURITY BASIC LEAD CARBONATE AND HIGH PURITY NORMAL LEAD CARBONATE

[75] Inventors: Michael A. Kolakowski, Milltown, N.J.; John J. Valachovic, Fremont, Calif.

[73] Assignee: NL Industries, Inc., New York, N.Y.

[21] Appl. No.: 247,441

[22] Filed: Mar. 25, 1981

[51] Int. Cl.³ .............................................. C01G 21/14
[52] U.S. Cl. ...................................... 423/435; 423/92; 423/619
[58] Field of Search ................... 423/92, 93, 435, 436, 423/619

[56] References Cited

U.S. PATENT DOCUMENTS 70,990 11/1867 Gattman .............................. 423/435
4,269,811 5/1981 Striffler, Jr. et al. .................. 423/92

Primary Examiner—Earl C. Thomas
Attorney, Agent, or Firm—Gary M. Nath

[57] ABSTRACT

A process is provided for the preparation of high purity basic lead carbonate and high purity normal lead carbonate by a double precipitation reaction employing a single lead acetate feed solution. The process is particularly applicable to processes for producing lead monoxide from solid lead sulfate-bearing materials such as battery mud.

17 Claims, 1 Drawing Figure

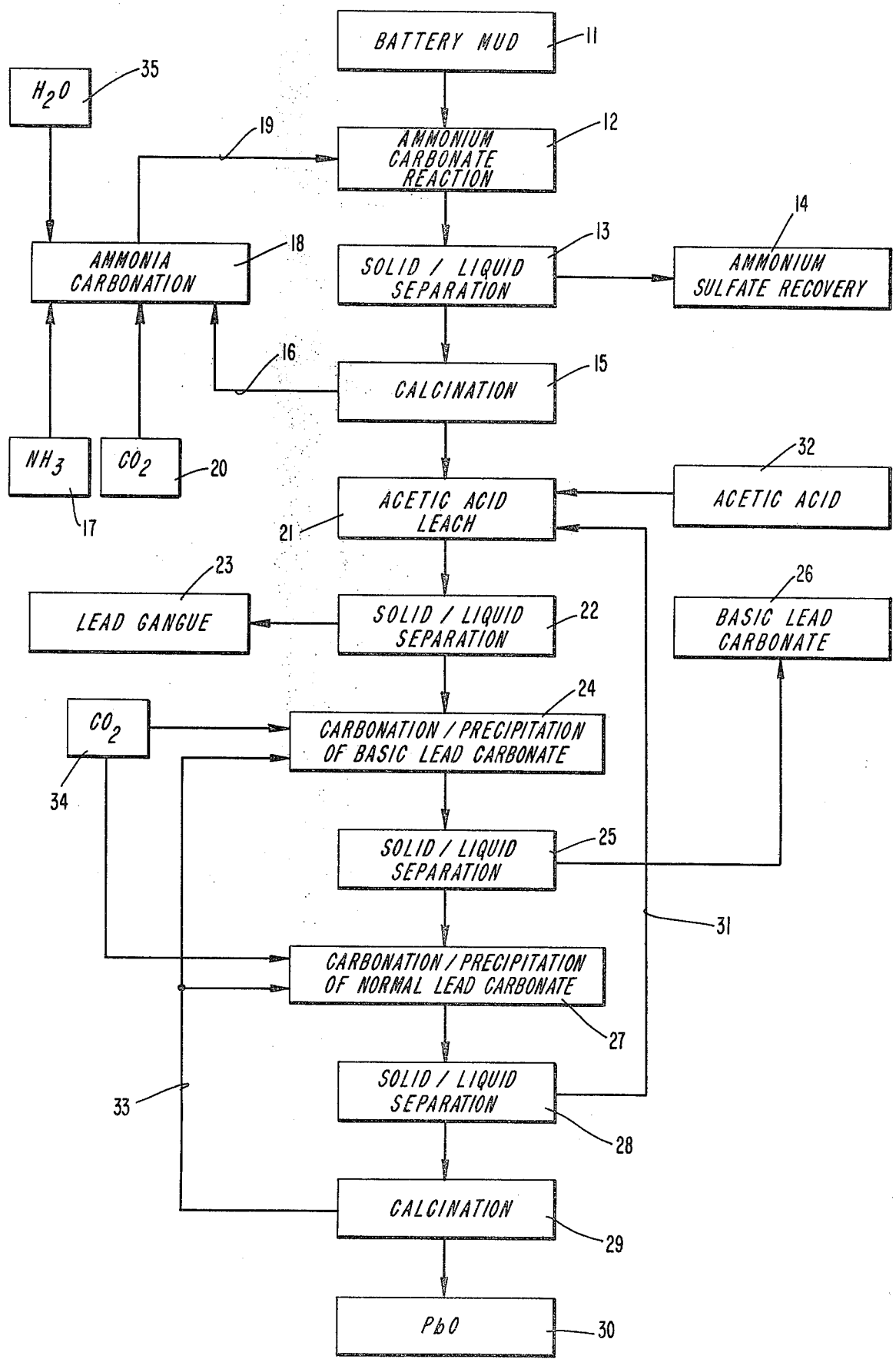

DOUBLE PRECIPITATION REACTION FOR THE FORMATION OF HIGH PURITY BASIC LEAD CARBONATE AND HIGH PURITY NORMAL LEAD CARBONATE

BACKGROUND OF THE INVENTION

This invention deals with the preparation of high purity basic lead carbonate and high purity normal lead carbonate in a single, multi-step process. The process involves a double precipitation reaction whereby the desired lead carbonate compounds are obtained from a lead acetate solution.

In the past, basic lead carbonate has been produced by a number of processes. In one process, commonly known as the Dutch process, metallic lead is cast in small perforated plates or buckles, which are placed in earthenware pots over a weak solution of acetic acid. The pots are stacked in layers in tanbark, each tier being supported by wood boards. The tiers are built up to as many as ten layers and the whole stack is then boarded up. Fermentation of the tanbark generates considerable heat and carbon dioxide. The heat volatilizes the acetic acid, causing it to react with the lead to form the lead acetate, which, in turn, is carbonated by the carbon dioxide to form the basic lead carbonate. After 100 to 120 days, the stacks are dismantled and the white powder is removed and ground in water, forming a water pulp. The water pulp may be filtered and dried to produce a dry basic lead carbonate powder, or it may be converted to a basic lead carbonate/oil paste by the addition of linseed oil. Because of the great affinity of basic lead carbonate for linseed oil, the oil will displace the water from the basic lead carbonate. The lead-in-oil paste is finished by passing it over a roller mill.

In a second process, generally known as the Carter process, powdered lead is suspended in water in large revolving wood cylinders, acetic acid is added, and carbon dioxide is passed into the cylinder. The reaction is completed in 10 to 12 days. This process permits better control than the older Dutch process and the finished product can be made with a wide range of physical properties.

Another process, commonly referred to as the Euston process, starts with feathered or mossy lead made by running molten refined lead metal into water. The feathered lead is then oxidized by air in a solution of normal lead acetate into which carbon dioxide is introduced. The basic lead carbonate forms as a precipitate and the lead acetate solution is recovered by filtration and re-used.

Yet another process is an electrolytic process, which makes use of a concrete cell divided by a porous membrane. In one portion of the cell, a lead anode is suspended in a solution of sodium acetate, and in the other portion of the cell an iron cathode is immersed in a basic sodium carbonate solution. The passage of the electric current removes the lead from the anode as lead acetate, which forms a precipitate of basic lead carbonate in the anolyte.

Another process, generally referred to as the Thompson-Stewart process, produces a basic lead carbonate of high quality and very fine particle size. Finely divided litharge, lead, or a mixture of both, is suspended as a slurry in water. Acetic acid is added, the material is aerated, and carbon dioxide is passed through. White lead of high basicity and fine particle size is produced in the process. See, e.g., U.S. Pat. No. 2,218,940 and *Kirk-Othmer Encyclopedia of Chemical Technology*, Volume 10, pp. 614–616 (1953).

Various processes for the preparation of white lead are described, e.g., in U.S. Pat. Nos. 428,017, 720,670, 1,349,334, 1,587,623, 1,720,196, 1,916,302, 4,118,219, Great Britain patent specification Nos. 226,689, 495,051 and the like.

Similarly, normal lead carbonate has been produced by a number of processes. See, e.g., U.S. Pat. Nos. 1,587,623, 1,916,302, 3,883,348 and the like.

Certain of these processes are known to generally disclose the production of either basic or normal lead carbonate. See, e.g., U.S. Pat. Nos. 1,587,623 and 1,916,302. However, such processes result in the precipitation of an admixture of basic and normal lead carbonate and are thus not suitable for the production of both a high purity basic lead carbonate product and a high purity normal lead carbonate product.

The ability to produce a high purity basic lead carbonate product and a high purity normal lead carbonate product in a single process and from the same starting material would be highly desirable from a commercial standpoint. Basic lead carbonate is capable of use as a pigment or as a heat stabilizer for flexible polyvinylchloride manufacture. Normal lead carbonate is useful as a starting material for the formation of various other lead compounds. The ability to obtain both these compounds in commercially useful form by a single process would also provide the opportunity for savings in equipment expenditures.

A single, multi-step process which produces high purity basic and normal lead carbonate products would have significant applicability in connection with the preparation of pure lead monoxide from impure lead sulfate bearing materials, particularly impure lead sulfate bearing materials such as recycled battery mud. One such process for the preparation of pure lead monoxide from recycled battery mud is described in U.S. patent application Ser. No. 126,625, entitled "Production of Lead Monoxide from Lead Sulfate with Acetic Acid", and filed Mar. 3, 1980, by Eugene Striffler Jr., et al, now U.S. Pat. No. 4,269,811, and is commonly assigned to the assignee of the present application. In such a process, pure lead monoxide is prepared in a multi-step process which comprises:

(a) reacting a lead sulfate-bearing material with an ammonium carbonate solution to convert lead sulfate to lead carbonate;

(b) decomposing the lead carbonate to form impure lead monoxide;

(c) reacting the impure lead monoxide with acetic acid to form a lead acetate solution;

(d) contacting the lead acetate solution with carbon dioxide to produce insoluble lead carbonate; and (e) decomposing the lead carbonate to form substantially pure lead monoxide.

Any lead dioxide present in the lead bearing material may also be decomposed along with lead carbonate in step (b) of the process to produce additional lead monoxide. Alternatively, such lead dioxide may be treated with acetic acid in step (c) together with a reducing agent to simultaneously decompose the lead dioxide and form additional lead acetate.

The process may be conducted in a continuous manner. In the continuous mode, the by-products of reactions occurring in the process are used to form the reagents used in the various steps of the process. More particularly, carbon dioxide formed as a by-product of the decomposition of lead carbonate in step (b) can be separated and combined with ammonia to produce the ammonium carbonate solution used in step (a). The carbon dioxide formed as a by-product of the decomposition of lead carbonate in step (e) can be recycled for use in step (d). The acetic acid produced as a by-product in step (d) can be recycled for use in step (c).

In addition, lead chemicals such as lead chromate, lead arsenate, and lead tungstate can be prepared by precipitation from the lead acetate solution formed in step (c) with appropriate reagents and separating the so-formed lead chemicals from the remaining solution.

A single, multiple-step process for the conversion of lead acetate solution to high purity basic and normal lead carbonate products could serve to replace step (d) above, thus providing the versatility to produce two commercially useful products, i.e., both types of lead carbonate, in the same processing equipment and from the same lead acetate starting material.

Thus, the search has gone on for a single, multi-step process for the double precipitation of high purity basic lead carbonate and high purity normal lead carbonate from a single starting material.

SUMMARY OF THE INVENTION

In one aspect of the present invention, there is provided a process for producing high purity basic lead carbonate and high purity normal lead carbonate from a single feed solution. The process comprises first contacting a lead acetate feed solution with carbon dioxide gas. The lead acetate feed solution has an initial lead to acetate mole ratio of greater than 0.5:1. Carbon dioxide gas is employed in an amount sufficient to reduce the lead to acetate mole ratio to 0.5:1 by precipitating high purity basic lead carbonate.

Next, the high purity basic lead carbonate is separated from the remaining lead acetate solution. After this separation, the remaining lead acetate solution is contacted with carbon dioxide gas. High purity normal lead carbonate is precipitated and separated from the remaining reactive acetate solution.

In another aspect of the present invention, there is provided a process for the preparation of high purity basic lead carbonate and high purity normal lead carbonate from a single lead acetate feed solution. The process comprises first contacting at atmospheric pressure a lead acetate feed solution having an initial mole ratio of lead to acetate of from greater than 0.5:1 to about 1:1 and a lead concentration of from about 1 to about 10 weight percent with carbon dioxide gas. The carbon dioxide gas is introduced in an amount effective to reduce the lead to acetate mole ratio to 0.5:1 by precipitating high purity basic lead carbonate.

The feed solution and gas are then mixed under agitation and at a temperature in the range of from about 50° to about 70° C., at atmospheric pressure and for a time sufficient to precipitate high purity basic lead carbonate ad reduce the lead to acetate mole ratio to 0.5:1. By filtering, the high purity basic lead carbonate is separated from the remaining lead acetate solution to form a high purity basic lead carbonate filter cake.

The remaining lead acetate solution is then contacted with carbon dioxide gas at a pressure in excess of about 50 p.s.i.g., at a temperature of from about 40 to about 100° C. and for a time sufficient to precipitate high purity normal lead carbonate. Maintaining said pressure in excess of about 50 p.s.i.g., the high purity precipitated normal lead carbonate is separated from the remaining acetic acid solution to form a high purity normal lead carbonate filter cake.

In still another aspect of the present invention, there is provided an improvement in a process for producing lead monoxide from solid lead sulfate bearing material. In the process, solid lead sulfate bearing material is reacted with an ammonium carbonate solution to convert said lead sulfate to lead carbonate. Substantially all of the lead carbonate is then decomposed to impure lead monoxide. The impure lead monoxide is reacted with an effective mount of acetic acid to convert the lead monoxide to a lead acetate solution. The lead acetate solution is then contacted with carbon dioxide gas to form normal lead carbonate. The normal lead carbonate is decomposed to produce lead monoxide.

In this aspect of the invention, the improvement comprises first contacting the lead acetate solution with carbon dioxide gas. The lead acetate solution has an initial mole ratio of lead to acetate of greater than 0.5:1. Carbon dioxide gas is employed in an amount sufficient to reduce the lead to acetate mole ratio of 0.5:1 by precipitating high purity basic lead carbonate. The high purity basic lead carbonate is separated from the remaining lead acetate solution, and the remaining lead acetate solution is then contacted with carbon dioxide gas to precipitate high purity normal lead carbonate.

The high purity normal lead carbonate is separated from the remaining reactive acetate solution prior to decomposing the normal lead carbonate.

In yet another aspect of the present invention, there is provided an improvement in a process for producing lead monoxide from solid lead sulfate bearing material. In the process, solid lead sulfate bearing material is reacted with an ammonium carbonate solution to convert said lead sulfate to lead carbonate. Substantially all of the lead carbonate is then decomposed to impure lead monoxide. The impure lead monoxide is reacted with an effective amount of acetic acid to convert the lead monoxide to a lead acetate solution. The lead acetate solution is then contacted with carbon dioxide gas to form normal lead carbonate. The normal lead carbonate is decomposed to produce lead monoxide.

In this aspect of the invention, the improvement comprises first contacting at atmospheric pressure the lead acetate solution with carbon dioxide gas. The lead acetate solution has an initial lead to acetate mole ratio of from greater than 0.5:1 to about 1:1 and a lead concentration of from about 1 to about 10 weight percent. Carbon dioxide gas is employed in an amount effective to reduce the lead to acetate mole ratio to 0.5:1 by precipitating high purity basic lead carbonate. The solution and gas are mixed under agitation and at a temperature in the range of from about 50° to about 70° C., at atmospheric pressure and for a time sufficient to precipitate high purity basic lead carbonate and reduce the lead to acetate mole ratio to 0.5:1.

The high purity basic lead carbonate is then filtered from the remaining lead acetate solution to separate the high purity basic lead carbonate and form a high purity basic lead carbonate filter cake. The remaining lead acetate solution is then contacted with carbon dioxide gas at a pressure in excess of about 50 p.s.i.g., at a temperature of from about 40° to about 100° C. and for a time sufficient to precipitate high purity normal lead carbonate. Maintaining said pressure in excess of about 50 p.s.i.g., the high purity precipitated normal lead carbonate is filtered from the remaining acetic acid solution to form a high purity normal lead carbonate filter cake prior to decomposing the normal lead carbonate.

These and other aspects of the present invention will become evident from the detailed description of the invention, the Examples and the claims herein.

BRIEF DESCRIPTION OF THE DRAWING

The FIGURE is a flow diagram of the improved process of this invention whereby lead monoxide is produced from solid lead sulfate bearing material with the formation of both high purity basic lead carbonate and high purity normal lead carbonate.

DESCRIPTION OF THE PREFERRED EMBODIMENTS

The present invention is directed to a multistep process for the preparation of lead carbonate compounds. Basic lead carbonate, i.e., basic carbonate white lead, and normal lead carbonate, both generated in a high state of purity, are prepared by a double precipitation reaction involving a lead acetate starting solution.

A number of compounds have generally been classified as basic lead carbonates. For example, oxycarbonates such as lead trioxypentacarbonate ($5PbCO_3.3PbO$), lead oxycarbonate ($PbCO_3.PbO$) and lead dioxycarbonate ($PbCO_3.2PbO$), all formed when normal lead carbonate is heated to decomposition at ordinary pressures, have been classified as basic lead carbonates. See, e.g., *Kirk-Othmer Encyclopedia of Chemical Technology*, Vol. 8, pages 268–69 (1952).

One compound, lead dihydroxydicarbonate ($2PbCO_3.Pb(OH)_2$), is commonly known in the trade as white lead or basic lead carbonate. As used in the specification and claims herein, the terms "white lead" and "basic lead carbonate" are meant to include lead dihydroxydicarbonate ($2PbCO_3.Pb(OH)_2$).

White lead or basic lead carbonate is useful as a pigment, e.g., a paint pigment, or as a heat stabilizer for flexible polyvinylchloride compounds. It also is useful as a starting material for the formation of other lead compounds. To produce lead monoxide, the basic lead carbonate is calcined at temperatures within the range of 400° to 800° C. to dissociate the lead carbonate into lead oxide, carbon dioxide and water vapor, in addition to any ammonia released from residual ammonium compounds. The lead monoxide produced by this calcining operation is a fine powder with a large specific surface. Small amounts of lead sulfate, generally less than 10% by weight are usually associated with the lead monoxide, normally in a tetrabasic lead sulfate crystal structure. The lead sulfate presumably comes from sulfate substitution in the lead carbonate crystal structure. Calcining the basic lead carbonate to the oxide typically requires several hours, depending upon the particular equipment and operating temperature employed.

To convert the basic lead carbonate to basic lead sulfates, the basic lead carbonate is sulfated with sulfuric acid typically in a sulfating cell, and then calcined at temperatures of about 400° to 800° C. for several hours. The resulting products are basic lead sulfates, e.g., tetrabasic lead sulfate, monobasic lead sulfate, normal lead sulfate or mixtures thereof. The amount of sulfuric acid added will determine the type of lead sulfate produced.

To convert the basic lead carbonate to pure lead, the basic lead carbonate is smelted, e.g., in a reduction furnace, at temperatures of about 800° to 1200° C., to produce pure lead metal. It has been found that the resulting lead metal has an extremely high degree of purity. The carbonate is preferably mixed with carbonaceous reducing agents and simple fluxes when fed to the furnace.

Normal lead carbonate, $PbCO_3$, is known to occur naturally, as the mineral cerussite. It is a white to grayish-black ore found in conjunction with other lead minerals, and is formed by the action of carbonated water on galena (lead sulfide) or its oxidation products. Normal lead carbonate is scarcely soluble in water, but is soluble in acids and alkalies. See, e.g., *Kirk-Othmer Encyclopedia of Chemical Technology*, Vol. 8, p. 268 (1952). Normal lead carbonate is useful as a starting material to form a number of other lead compounds. For example, the normal lead carbonate formed in the double precipitation reaction of the present invention may be converted into lead chromate or lead arsenate. In the process for making lead chromate, normal lead carbonate is slurried with water and a small amount of acetic acid. A solution of chromic acid is then added to the lead carbonate slurry to produce lead chromate. A similar process may be employed for conversion of normal lead carbonate into lead arsenate.

In the first step of the process of the present invention, a solution of lead acetate is contacted with carbon dioxide to precipitate basic lead carbonate. The lead acetate starting solution may be obtained from any available source. For example, high purity lead oxide (PbO) or an impure lead oxide composition may be leached with an acetic acid solution (HAc). During this acetic acid leach step, the lead oxide reacts with the acetic acid to form soluble lead acetate and/or basic lead acetate.

$PbO + HAc$ 

$PbAc_2 + H_2O$ 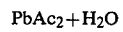

(soluble lead acetate)

$2PbO + 2HAc$ 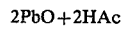

$PbAc_2Pb(OH)_2$ 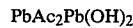

(basic lead acetate)

Where pure lead oxide is used to prepare the lead acetate starting or feed solution, a leach efficiency of 100% can be achieved if the reaction temperature is maintained at about 60° C., a 1:1 Pb/Ac mole ratio is maintained and the amount of soluble lead in solution remains at about 8.0% by weight. Reaction times are a function of solids dissolution time, and generally range from about 10 to about 30 minutes.

Alternatively, lead dioxide might be reacted with a reducing agent such as hydrogen peroxide and the acetic acid solution to form soluble lead acetate.

$PbO_2 + 2HAc + H_2O_2$ 

$PbAc_2 + 2H_2O + O_2$ 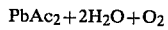

Returning to the first step of the process of the present invention, a lead acetate solution having a lead to acetate mole ratio of greater than 0.5:1 is contacted with carbon dioxide gas in an amount sufficient to precipitate high purity basic lead carbonate. Lead acetate feed solutions having lead to acetate mole ratios of from greater than 0.5:1 to about 1.1 are preferred, with lead acetate feed solutions having a 1:1 lead to acetate mole ratio being most preferred. When lead acetate feed solutions are employed having the most preferred lead to acetate mole ratio of about 1:1, impurities in the starting solutions are minimized. It is believed that impurities such as metallic impurities are not solubilized during the formation of the starting solution, e.g., in the acetic acid leach step discussed above.

The concentration of lead in the starting solution may range from about 1 to about 10 weight percent, preferably about 8 weight percent lead. The contacting step is preferably carried out at atmospheric pressure.

The gas-liquid mixture of lead acetate solution and carbon dioxide is then agitated, e.g., passed through a mixing device such as a static mixer, to thoroughly disperse the gas and to cause the rapid precipitation of basic lead carbonate. Carbon dioxide is introduced and mixed with the lead acetate solution in an amount effective to precipitate high purity basic lead carbonate. So long as the lead to acetate mole ratio of the feed solution is maintained at greater than 0.5:1, carbon dioxide may be introduced in any amount effective to precipitate high purity basic lead carbonate. Where amounts in excess of that required to precipitate high purity basic lead carbonate are employed, the excess amounts will bubble through and out of the feed solution without detrimentally affecting the ongoing precipitation reaction. When a continuous process is employed, at steady state conditions, carbon dioxide is employed in a carbon dioxide to lead mole ratio of 0.5:1.

The temperature of the gas-liquid mixture is maintained in the range of about 50° to about 70° C., preferably at about 60° C.

The first contacting step of the process of the present invention is continued until the lead to acetate mole ratio in the feed solution is reduced to 0.5:1. Under these conditions, about 50% by weight of the soluble lead in solution will be precipitated as high purity basic lead carbonate. If the first contacting step of the process is continued beyond this point, i.e., if the lead to acetate mole ratio of the feed solution is reduced to below 0.5:1, precipitation of normal lead carbonate is initiated. Furthermore, when the lead to acetate mole ratio of the feed solution is reduced below 0.5:1, the basic lead carbonate previously precipitated out is converted to normal lead carbonate.

Thus, when the lead to acetate mole ratio of the feed solution is reduced to 0.5:1, the slurry resulting from the first-stage precipitation of basic lead carbonate is filtered to remove the basic lead carbonate. Filtration yields a basic lead carbonate filter cake containing solids from about 40 to about 70% by weight, e.g., about 55% by weight, based on the total cake weight. A normal lead acetate filtrate solution containing from about 0.5 to about 10 weight percent lead, preferably about 4 weight percent, soluble lead also results.

This filtrate from this first precipitation is used as the feed or starting solution for the step of precipitating normal lead carbonate. The normal lead acetate solution in the second precipitation is again contacted with carbon dioxide. The remaining soluble lead will be precipitated in the form of high purity normal lead carbonate. The second precipitation reaction generally takes place at temperatures of from about 40° C. to the boiling point of the acetate solution under atmospheric pressure, i.e., about 100° C., and preferably at temperatures of from about 50 to about 70° C. and at pressures greater than atmospheric, preferably at pressures in the excess of about 50 p.s.i.g., and most preferably at a pressure of about 50 p.s.i.g. The reaction also preferably takes place in a highly agitated environment. In the absence of increased pressures, it is believed that the reverse reaction of normal lead carbonate with acetic acid will be encouraged, resulting in undesirably low yields of normal lead carbonate.

The slurry resulting from the second-stage precipitation of normal lead carbonate is filtered to remove the normal lead carbonate. Filtration generally takes place at pressures greater than atmospheric, generally at pressures in the range of from about 40 to about 60 p.s.i.g., preferably at a pressure of about 50 p.s.i.g. The normal lead carbonate filter cake formed contains from about 75 to about 95% solids by weight, e.g., about 90% by weight solids. A solution containing from about 1 to about 10% by weight reactive acetate and a minor amount of soluble lead, i.e., an acetic acid solution, is also obtained from the filtration.

After filtration, the filtered normal lead carbonate cake is washed with water, while still maintaining the pressure above atmospheric, e.g., preferably at pressures in excess of about 50 p.s.i.g., most preferably at a pressure of about 50 p.s.i.g. Maintaining superatmospheric pressure prevents any decomposition by reaction with the residual acetic acid in the filter cake. The pressure can be reduced to atmospheric levels only after the acetic acid is washed from the filter cake.

The term "high purity basic lead carbonate" as used herein means a basic lead carbonate precipitate containing less than about 5% impurities such as lead sulfate and normal lead carbonate and preferably less than about 2% impurities.

The term "high purity normal lead carbonate" as used herein means a normal lead carbonate precipitate containing less than about 1% impurities such as metallic ions and lead sulfate and preferably less than about 0.1% impurities.

Each precipitation in the double precipitation reaction process of the present invention may be conducted in a batch-wise or continuous manner.

One area of particular applicability for the double precipitation reaction of the present invention is in connection with the preparation of lead monoxide from impure lead sulfate-bearing materials, particularly impure lead sulfate-bearing materials such as battery mud. In one such process, described in U.S. patent application Ser. No. 126,625 identified above, a lead acetate/acetic acid solution intermediary product is carbonated to produce normal lead carbonate, which is subsequently calcined to produce pure lead monoxide. The acetic acid solution obtained upon separation of the normal lead carbonate precipitate is recycled for use in an earlier process step, and the carbon dioxide resulting from the calcination step is recycled for use in the carbonation of the normal lead carbonate.

In more detail, the process in which the double precipitation reaction of the present invention may be employed comprises:

(a) reacting a lead sulfate-bearing material with an ammonium carbonate solution to convert lead sulfate to lead carbonate;

(b) decomposing the lead carbonate to form impure lead monoxide;

(c) reacting the impure lead monoxide with acetic acid to form a lead acetate solution;

(d) contacting the lead acetate solution with carbon dioxide to produce normal lead carbonate; and (e) decomposing the normal lead carbonate to form substantially pure lead monoxide.

In the improved present invention, a double precipitation reaction is employed in place of step (d), resulting in the formation of both high purity basic lead carbonate and high purity normal lead carbonate.

Any lead dioxide present in the lead-bearing starting material may also be decomposed along with lead carbonate in step (b) of the process to produce additional lead monoxide. Alternatively, such lead dioxide may be treated with acetic acid in step (c) together with a reducing agent to simultaneously decompose the lead dioxide and form additional lead acetate.

The process may be performed in a continuous manner wherein the by-products of reactions occurring in the above process are used to form the reagents used in the various steps of the process. More particularly, carbon dioxide formed as a by-product of the decomposition of lead carbonate in step (b) can be separated and combined with ammonia to produce the ammonium carbonate solution used in step (a). The carbon dioxide formed as a by-product of the decomposition of normal lead carbonate in step (e) can be recycled for use in step (d). The acetic acid produced as a by-product in step (d) can be recycled for use in step (c).

In addition, lead chemicals such as lead chromate, lead arsenate, and lead tungstate can be prepared by precipitation from the lead acetate solution formed in step (c) with appropriate reagents and separating the so-formed lead chemicals from the remaining solution.

The starting material for the process of this invention is a lead-bearing material, particularly a lead sulfate-bearing material such as battery mud. Such battery mud consists mainly of chemically reactive lead compounds such as lead sulfate, and varying amounts of lead dioxide, lead-antimony alloys and other complex lead bearing compounds and battery parts. Such battery parts, namely grid metal, plastics, and battery mud fines may be separated by well known separatory methods known in the art, from the mud.

The lead-bearing material is slurried in water and then reacted with an ammonium carbonate solution wherein the lead sulfate contained therein is reacted and converted to insoluble lead carbonate and soluble ammonium sulfate according to the following reaction:

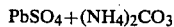

$PbSO_4 + (NH_4)_2CO_3$

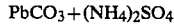

$PbCO_3 + (NH_4)_2SO_4$

Unreacted materials such as lead dioxide remain undissolved in admixture with the insoluble lead carbonate in the ammonium sulfate solution.

Generally an aqueous solution of ammonium carbonate is employed containing from 1.5% to 12.5% ammonium carbonate and preferably about 6.5%. A lead battery mud containing from about 16–18 weight percent of sulfate anion can be employed in the first step. Such mud is slurried with water to form a heterogeneous dispersion containing from about 10% to about 60% by weight of mud and preferably about 35% by weight. The mud slurry and ammonium carbonate solution are then combined, at a mole ratio of ammonium carbonate to lead sulfate in the mud slurry of from 1:1 to 1.25:1 at temperatures of from about 25° C. to about 60° C., and preferably about 30° C. Reaction time may vary from about 1 minute to about 60 minutes but generally all reactions are completed between about 5 and about 15 minutes.

After the reaction is substantially completed, the ammonium sulfate solution is separated from the lead carbonate and other insoluble materials by conventional solid/liquid separation techniques. The isolated ammonium sulfate solution may then be crystallized to recover solid ammonium sulfate.

Alternately and more preferably, the ammonium carbonate desulfation of battery mud may be carried out in two stages wherein fresh ammonium carbonate solution is added to the second stage and the ammonium carbonate solution used in the first stage is the recovered ammonium carbonate solution from the second stage. In this embodiment, virgin battery mud is slurried in the first or primary stage with recovered ammonium carbonate solution from the secondary desulfation stage. The slurry is thickened by removal of supernatant ammonium sulfate solution. The separated ammonium sulfate solution is then sent to an ammonium sulfate crystallizer for recovery of solid ammonium sulfate. The thickened slurry is then reacted with fresh ammonium carbonate in a secondary stage to convert substantially all lead sulfate in the battery mud to lead carbonate and to form additional ammonium sulfate. The lead carbonate and other insolubles in the form of a slurry is thickened and the thickened slurry is filtered and washed in a horizontal vacuum filter. The solution recovered from the thickener, containing both ammonium carbonate and ammonium sulfate, is recycled to the first stage desulfation above.

The lead carbonate and other insoluble material separated from the desulfation step are next calcined or heated at temperatures sufficient to decompose the lead carbonate to lead monoxide and carbon dioxide according to the following reaction:

$PbCO_3$

$PbO + CO_2$

Generally, the temperatures required to decompose the lead carbonate are from about 400° C. to about 650° C., preferably about 600° C. Preferably, the heating should be conducted in an inert atmosphere even though it may be conducted in a slightly oxidizing atmosphere. Heating is conducted for between about 15 and about 90 minutes to convert substantially all the lead carbonate to lead monoxide. Most usually, however, all decomposition is completed within about 60 minutes. The carbon dioxide evolved may be separated from the lead monoxide and reacted with ammonia to form ammonium carbonate which may in turn be used as the ammonium carbonate leach for desulfation of the battery mud.

Any lead dioxide contained in the insoluble residue after ammonium carbonate treatment may also be decomposed along with the lead carbonate to form additional lead monoxide and oxygen according to the following:

$2PbO_2$

$2PbO + O_2$

A portion of lead metal contained in the solids is also converted to lead monoxide. The lead monoxide product in admixture with undecomposed lead dioxide or lead carbonate and other insoluble materials is leached with an acetic acid solution (HAc). During this acetic acid leach step, the lead monoxide reacts with acetic acid to form soluble lead acetate and/or basic lead acetate.

$$PbO + HAc\ PbAc_2 + H_2O$$

(lead acetate) or $$2PbO + 2HAc\ PbAc_2Pb(OH)_2$$

(basic lead acetate)

Any undecomposed lead carbonate is converted to soluble lead acetate by acetic acid during the reaction as follows:

$$PbCO_3 + 2HAc\ PbAc_2 + H_2O + CO_2$$

Alternatively to decompose and react lead dioxide in this step, a reducing agent such as hydrogen peroxide may be added with the acetic acid solution to form lead acetate as follows:

$$PbO_2 + 2HAc + H_2O_2\ PbAc_2 + 2H_2O + O_2$$

Generally, a 0.1-15 weight percent, preferably a 0.5-5 weight percent solution of acetic acid is combined with the products of calcination as a water slurry in stoichiometric ratios of 1:0.5 to 1:1.5 acetate to reactive lead. While stoichiometric amounts of acetic acid to reactive lead may be employed, best results are achieved at mole ratios of 1:0.9 to 1:1 due to an unexpected increase in purity of the resultant lead acetate solution and precipitates. Such purity improvement ultimately results in increased lead monoxide purities in the final product as well. The concentration of reactive lead (lead carbonate, lead oxide and lead dioxide) in the calcined feed is not critical but for efficient operation the lead concentration should be from about 50% to about 99% by weight. The solution is contacted with the slurry at a wide range of temperatures. Increasing temperatures above about 15° C. results in the concomitant increase in reaction rate with preferred conditions being atmospheric pressure at temperatures from about 50° C. to the boiling point of the acetic acid solution. Reaction times between 5 and 60 minutes are necessary to complete the reaction.

The lead acetate solution formed by the reactions between the acetic acid and lead monoxide, undecomposed lead carbonate, if any, and lead dioxide, if any, plus reducing agent are separated from the insoluble residue containing minor amounts of basic lead acetate and lead gangue. The insoluble residue is then sent to a smelter to recover the lead values therefrom.

It has also been discovered that the lead concentration of the acetic acid solution has a significant effect upon the purity of the lead acetate solution and precipitate. In this regard it is preferred to utilize a lead concentration of from about 1% to about 10%. It is believed that an equilibrium reaction between the various soluble and insoluble basic lead acetate compounds exists in the acetic acid solution. It is desired to form $PbO\ PbAc_2$, a soluble acetate. However, $2\ PbO\ PbAc_2$, an insoluble acetate is also formed. The insoluble acetate is lost in the gangue during separation. When lead concentrations in the acetic acid solution on the order of about 8% are utilized, the gangue loss problem can be minimized to a large extent.

It is somewhat difficult to separate the insoluble gangue materials under ambient temperature conditions. However, when the acetic acid solution is maintained at temperatures of about 50° C. or greater, the gangue materials flocculate and thus separation is materially enhanced.

A portion of the separated lead acetate solution may be used to prepare lead chemicals such as lead chromate, lead tungstate, lead molybdate, lead arsenate and the like by reaction with appropriate reagents.

The next step, corresponding to step (d) of the process described in U.S. patent application Ser. No. 126,625, is replaced by the double precipitation reaction of the present invention resulting in the formation of high purity basic lead carbonate and high purity normal lead carbonate. This double precipitation reaction is described in more detail above.

After the normal lead carbonate is separated from the reactive acetate solution, it is then calcined at temperatures of from about 400° to about 800° C., preferably from about 550° to about 650° C., in an inert or slightly oxidizing atmosphere for from about one minute to reaction completion, to produce substantially pure lead monoxide and carbon dioxide. The vapors from the calcination are partially condensed to yield an acetic acid solution which can be returned to the leach step. The non-condensed $CO_2$ vapors can be compressed and recycled to the lead carbonate precipitation step in the continuous embodiment of this invention as will be shown in more detail below. The term "substantially pure" as used herein means the product contains less than 1% impurities such as primary iron oxide and antimony oxide and preferably less than 0.1% impurities.

The general principles and specific details described herein with regard to the use of the double precipitation reaction of the present invention in processes for the conversion of battery mud to pure lead monoxide are applicable not only in that aspect of the present invention, but to the other aspects of the invention as well.

The FIGURE shows a process flow diagram of one continuous method in which the double precipitation reaction of the present invention may be employed and wherein by-products of various reactions such as carbon dioxide from lead carbonate calcinations and acetic acid from the lead acetate carbonation are recycled or used to prepare reagents used in the process.

A battery mud feed 11 containing lead sulfate, lead dioxide and other materials is reacted at 12 with ammonium carbonate solution fed through line 19. The products, comprising an ammonium sulfate solution and insoluble lead carbonate, as well as lead dioxide, are separated at 13. The separated ammonium sulfate solution is then crystallized to recover solid ammonium sulfate at 14. The solid residues from the separation 13 are calcined at 15 to produce impure lead oxide, oxygen and carbon dioxide. The formed carbon dioxide is drawn off at 16 and combined with ammonia from source 17 and water from source 35 in tank 18 to form an ammonium carbonate solution. The ammonium carbonate solution is then added to the battery mud through line 19 at 12 to react with incoming battery mud. A carbon dioxide source 20 is used for start-up and make-up purposes to produce the ammonium carbonate solution. As previously mentioned, the ammonium carbonate desulfation may be carried out where fresh ammonium carbonate feed from the ammonia carbonation reaction at 18 is added to the ammonium carbonate reaction at 12.

After completion of the calcination step at 15, the impure lead monoxide and other impurities are subjected to an acetic acid leach at 21 to form a solution of lead acetate and an insoluble residue. The lead acetate solution is separated from the solids at 22. The solids, comprising a lead gangue, are removed at 23 for smelting. A portion of the lead acetate solution may be used at this point to prepare other lead chemicals as well known in the art. The lead acetate solution is treated with carbon dioxide at 24 and 26 by the double precipitation reaction of the present invention to precipitate high purity basic lead carbonate and high purity normal lead carbonate and to form a reactive acetate solution. The basic lead carbonate precipitated at 24 is separated by filtration from the remaining lead acetate solution at 25 and the high purity basic lead carbonate is recovered at 26. The lead acetate solution exiting 25 is employed as the feed solution for the second precipitation, i.e., the precipitation of normal lead carbonate at 27 under pressure. After separation under pressure of the normal lead carbonate from the solution at 28, the normal lead carbonate is calcined by heating at 29 to form a pure PbO product at 30 and carbon dioxide.

The reactive acetate solution is separated at 28 under pressure and is then recycled to the acetic acid leach step via line 31 to leach incoming lead oxide at 21. Acetic acid solution 32, is used for make-up or start-up purposes.

The carbon dioxide from the calcination 29 is withdrawn in line 33, compressed and recycled to carbonation/precipitation steps 24 and 26. Carbon dioxide source 34 is used for start-up and make-up purposes for the carbonation/precipitation reactions.

The invention is additionally illustrated in connection with the following Examples, which are to be considered to be illustrative of the present invention. It should be understood, however, that the invention is not limited to the specific details of the Examples. All parts and percentages in the claims and in the remainder of the specification are by weight unless otherwise specified.

EXAMPLE I

Approximately 100 lbs. of an 8 wt. % Pb solution of lead acetate in a lead to acetate mole ratio of about 1:1 is reacted with carbon dioxide in a Pb:$CO_2$ mole ratio of 2:1 at atmospheric pressure and at about 60° C. Carbon dioxide is bubbled into the solution continuously over a period of about two hours. The resultant mixture is filtered to remove the basic lead carbonate. The filter cake is then reslurried with about 30 pounds of water and filtered. The basic lead carbonate cake is then dried overnight at a temperature of about 105° C. Approximately 4.7 lbs. of basic lead carbonate is obtained.

The solution obtained from the first filtration of basic lead carbonate is reacted with an excess of carbon dioxide at a pressure of about 65 p.s.i.g. and at a temperature of about 60° C. The carbon dioxide is sparged into the solution while maintaining a constant pressure. The mixture is then filtered and washed with water, under a pressure of about 65 p.s.i.g. The normal lead carbonate cake is dried overnight at a temperature of about 105° C. Approximately 4.2 lbs. of normal lead carbonate is obtained.

EXAMPLE II

Approximately 500 lbs. per hour of an 8 wt. % Pb solution of lead acetate in a lead to acetate mole ratio of about 1:1 is reacted with carbon dioxide in a Pb:$CO_2$ mole ratio of 2:1 at atmospheric pressure and at about 60° C. Carbon dioxide is continuously introduced into the solution by way of a sparging device at a flow rate of about 30 standard cubic ft. per hour. After introduction of the carbon dioxide, the gas-liquid mixture is passed through a static mixer whereby the gas is dispersed evenly throughout the solution and a uniform precipitation of basic lead carbonate results. The lead acetate solution employed in this precipitation is initially prepared by leaching of high purity lead oxide with high purity acetic acid in deionized water. The leaching occurs at a temperature of about 60° C., an effective mole ratio of lead:acetate of 1:1, and at a lead concentration of 8 wt. %. Leaching is completed when all solids are dissolved, in about 1.5–2.0 hours.

The solid basic lead carbonate precipitate formed by the initial carbonation of the lead acetate solution is separated from the remaining lead acetate solution by a plate filter. Approximately 50 wt. % of the lead in the feed lead acetate solution is converted to basic lead carbonate precipitate, and the precipitate is produced at a rate of about 40 lbs./hr.

The filtrate obtained from the plate filter is used as the feed solution for the precipitation of normal lead carbonate. From a holding tank, the filtrate is passed to a pressurized back-mix reactor at a rate sufficient to maintain a 50% volume in the pressurized reactor. Employing a reactor residence time of about five minutes and pressurizing the reactor with carbon dioxide to about 50 p.s.i.g., a high purity normal lead carbonate solid is precipitated. The reactor temperature is about 50° C. and the gas-liquid mixture is highly agitated during the reaction to evenly disperse the $CO_2$ gas and ensure a uniform precipitation of normal lead carbonate solid.

The resulting normal lead carbonate slurry is filtered through a plate and frame press under a pressure of about 50 p.s.i.g. About 30 lbs./hr. of high purity normal lead carbonate is produced, and a filtrate of substantially lead-free, reactive acetate solution (i.e., an acetic acid solution) also results.

EXAMPLE III

Battery mud containing about 71% lead, 18% sulfate anion, 21% lead dioxide and minor amounts of antimony, iron and silica is fed to a desulfation reactor (primary reactor) with recycled ammonium carbonate from a second desulfation reactor and is reacted to form a slurry containing about 30 to 40% solids. The battery mud is then leached (reacted) at a temperature of about 20° to about 30° C. for about 30 minutes to convert about 70 to about 75% of the lead sulfate content to lead carbonate. The resulting slurry is thickened to a solids level of about 66% by removal of a supernatant solution containing about 17% ammonium sulfate.

The solids slurry is then reacted with a fresh 6.5% ammonium carbonate solution in counter-current fashion in a secondary desulfation reactor at a 4:1 to 5:1 mole ratio of ammonium carbonate to lead sulfate to yield a lead carbonate slurry. The slurry is concentrated to a solids level of about 66%. The resulting slurry is filtered and washed in a horizontal vacuum filter to form a solids cake having about 77% solids.

The filter cake is then calcined at about 550° C. for about 1.5 hours in an inert or slightly oxidizing atmosphere to evaporate residual water and decompose the lead carbonate to lead monoxide and carbon dioxide. Fiber material associated with the battery mud is also decomposed along with lead dioxide to lead monoxide.

The calcined, desulfated battery mud containing lead monoxide in admixture with other solid impurities is combined with a 3.5 to 4.0% solution of acetic acid to form a 14 to 15% solids slurry before reaction. The concentration of lead in the calcined feed is from about 75 to about 90%. The so-formed mud is leached at about 60° C. for about 1 hour, resulting in a 3 to 6% solids slurry which is concentrated to a 40 to 45% slurry in a thickener, and then filtered in a horizontal vacuum filter to form a solids cake having about 66% solids.

The overflow from the thickener is a lead acetate solution containing 8 to 9% soluble lead which is fed to a first precipitation reactor. Gaseous carbon dioxide is bubbled into the solution at atmospheric pressure to precipitate wholly basic lead carbonate. The resulting slurry is then filtered to generate a basic lead carbonate cake.

The lead acetate filtrate solution from this first precipitation is reacted with gaseous carbon dioxide under a pressure of about 50 p.s.i.g. and at a mole ratio of $Pb:CO_2$ of 1:1. The resulting wholly normal lead carbonate precipitate is filtered to generate a normal lead carbonate filter cake.

The resulting wholly normal lead carbonate cake is dried and decomposed to lead oxide and carbon dioxide at about 600° C. for about 2 hours. The resulting substantially pure product had a total impurity concentration of about 250 ppm. The filtrate from the precipitation of normal lead carbonate is an acetic acid solution which is recycled to the leach reactor.

EXAMPLE IV

The battery mud of Example III is desulfated as described in Example III.

The desulfated battery mud containing lead monoxide, lead oxide, lead dioxide, and lead carbonate in admixture with other solid impurities is combined with a 5.3 to 5.8% solution of acetic acid and a 30% hydrogen peroxide solution in a 1:1 stoichiometric ratio with the lead dioxide to form a lead acetate solution containing about 8 to 9% soluble lead. The mud is leached at about 60° C. for about 1 hour. The resulting 2 to 3% solids slurry is concentrated to a 40 to 45% solids slurry in a thickener which is filtered to a solids cake having about 66% solids. This cake or gangue is collected and is suitable for conventional smelting operations. The filtrate is returned to the thickener.

The overflow from the thickener is an 8 to 9 wt. % Pb solution of lead acetate which is fed to a precipitation reactor. Gaseous carbon dioxide is bubbled into the solution at atmospheric pressure and at a flow rate so as to maintain a 2:1 $Pb/CO_2$ mole ratio to precipitate wholly basic lead carbonate. The resulting slurry is then filtered to generate a basic lead carbonate cake. The lead acetate filtrate solution from this first precipitation is reacted with gaseous carbon dioxide under a pressure of about 50 p.s.i.g. and at a mole ratio of $Pb:CO_2$ of 1:1. A lead carbonate consisting entirely of normal lead carbonate is precipitated out of solution and is filtered under a pressure of about 50 p.s.i.g., to form a wholly normal lead carbonate filter cake. This cake is dried and decomposed to lead oxide and carbon dioxide by calcination at about 600° C. for about two hours. The resulting product is substantially pure lead monoxide having a total impurity concentration of about 250 ppm. The filtrate from the precipitation of normal lead carbonate is an acetic acid solution which is recycled to the leach reactor.

Although the invention has been described with preferred embodiments, it is to be understood that variations and modifications may be resorted to as will be apparent to those skilled in the art. Such variations and modifications are considered to be within the purview and the scope of the claims appended hereto.

We claim:

1. A process for producing high purity basic lead carbonate and high purity normal lead carbonate from a single feed solution comprising:
   (a) first contacting a lead acetate feed solution having an initial lead to acetate mole ratio greater than 0.5:1 and a lead concentration of from about 1 to about 10 weight percent with carbon dioxide gas in an amount effective to reduce the lead to acetate mole ratio to 0.5:1 by precipitating high purity basic lead carbonate;
   (b) separating the high purity basic lead carbonate from the remaining lead acetate solution;
   (c) then contacting the remaining lead acetate solution with carbon dioxide gas to precipitate high purity normal lead carbonate; and
   (d) separating the high purity normal lead carbonate from the remaining reactive acetate solution.

2. A process according to claim 1 wherein the step of first contacting the lead acetate feed solution with carbon dioxide gas is carried out at atmospheric pressure.

3. A process according to claims 1 or 2 wherein the steps of contacting the remaining lead acetate solution with carbon dioxide gas and separating the high purity normal lead carbonate from the remaining reactive acetate solution are carried out at greater than atmospheric pressure.

4. A process according to claim 1 wherein the lead acetate feed solution initially has a mole ratio of lead to acetate of from greater than 0.5:1 to about 1:1 and a concentration lead of about 1 to about 10 weight percent.

5. A process according to claim 4 wherein the lead acetate feed solution initially has a mole ratio of lead to acetate of about 1:1 and a concentration of lead about 8 weight percent.

6. A process according to claim 1 wherein the step of first contacting the lead acetate feed solution with carbon dioxide gas is carried out under agitation and at a temperature in the range of from about 50° to about 70° C.

7. A process according to claim 1 wherein the high purity basic lead carbonate is separated from the remaining lead acetate solution by filtering said high purity basic lead carbonate to form a filter cake.

8. A process according to claim 1 wherein the step of contacting the remaining lead acetate solution with carbon dioxide gas is carried out at a pressure in excess of about 50 p.s.i.g.

9. A process according to claim 1 wherein the step of separating the high purity normal lead carbonate from the remaining acetate solution comprises filtering at a pressure in excess of about 50 p.s.i.g. and wherein the remaining reactive acetate solution is acetic acid.

10. A process according to claim 1 wherein the lead acetate feed solution is obtained by leaching lead oxide with an acetic acid solution at a temperature of about 60° C.

11. A process for the preparation of high purity basic lead carbonate and high purity normal lead carbonate from a single lead acetate feed solution comprising:
(a) first contacting at atmospheric pressure a lead acetate feed solution having an initial mole ratio of lead to acetate of from greater than 0.5:1 to about 1:1 and a lead concentration of from about 1 to about 10 weight percent with carbon dioxide gas in an amount effective to reduce the lead to acetate mole ratio to 0.5:1 by precipitating high purity basic lead carbonate;
(b) mixing said feed solution and gas under agitation and at a temperature in the range of from about 50° to about 70° C., at a atmospheric pressure and for a time sufficient to precipitate high purity basic lead carbonate and reduce the lead to acetate mole ratio to 0.5:1;
(c) filtering said high purity basic lead carbonate to separate the high purity basic lead carbonate from the remaining lead acetate solution to form a high purity basic lead carbonate filter cake;
(d) then contacting said remaining lead acetate solution with carbon dioxide gas at a pressure in excess of about 50 p.s.i.g., at a temperature of from about 40° to about 100° C. and for a time sufficient to precipitate high purity normal lead carbonate;
(e) maintaining said pressure in excess of about 50 p.s.i.g.;
(f) filtering said high purity precipitated normal lead carbonate under said pressure to separate the high purity normal lead carbonate from the remaining acetic acid solution and to form a high purity normal lead carbonate filter cake.

12. In a process for producing lead monoxide from solid lead sulfate-bearing material by reacting solid lead sulfate-bearing material with an ammonium carbonate solution to convert said lead sulfate to lead carbonate, decomposing substantially all of the lead carbonate to impure lead monoxide, reacting the impure lead monoxide with an effective amount of acetic acid to convert said lead monoxide to a lead acetate solution, contacting the lead acetate solution with carbon dioxide gas to form normal lead carbonate, and decomposing the normal lead carbonate to produce lead monoxide, the improvement comprising:
(a) first contacting the lead acetate solution having an initial lead to acetate mole ratio greater than 0.5:1 and a lead concentration of from about 1 to about 10 weight percent, with carbon dioxide gas in an amount effective to reduce the lead to acetate mole ratio to 0.5:1 by precipitating high purity basic lead carbonate;
(b) separating the high purity basic lead carbonate from the remaining lead acetate solution;
(c) then contacting the remaining lead acetate solution with carbon dioxide gas to precipitate high purity normal lead carbonate; and
(d) separating the high purity normal lead carbonate from the remaining reactive acetate solution.

13. A process according to claim 12 wherein the lead acetate feed solution initially has a mole ratio of lead to acetate of from greater than 0.5:1 to 1:1 and a concentration of lead of about 1 to about 10 weight percent.

14. A process according to claim 13 wherein the lead acetate feed solution initially has a mole ratio of lead to acetate of about 1:1 and a concentration of lead of from about 8 weight percent and wherein the step of first contacting the lead acetate solution with carbon dioxide gas is carried out under agitation and at a temperature in the range of from about 50° to about 70° C.

15. A process according to claim 12 wherein the high purity basic lead carbonate is separated from the remaining lead acetate solution by filtering said high purity basic lead carbonate to form a filter cake.

16. A process according to claim 12 wherein the step of contacting the remaining lead acetate solution with carbon dioxide gas is carried out at a pressure in excess of about 50 p.s.i.g. and wherein the step of separating the high purity normal lead carbonate from the remaining acetate solution comprises filtering while maintaining the pressure in excess of about 50 p.s.i.g.

17. In a process for producing lead monoxide from solid lead sulfate-bearing material by reacting solid lead sulfate-bearing material with an ammonium carbonate solution to convert said lead sulfate to lead carbonate, decomposing substantially all of the lead carbonate to impure lead monoxide, reacting the impure lead monoxide with an effective amount of acetic acid to convert said lead monoxide to a lead acetate solution, contacting the lead acetate solution with carbon dioxide gas to form normal lead carbonate, and decomposing the normal lead carbonate to produce lead monoxide, the improvement comprising:
(a) first contacting at atmospheric pressure the lead acetate solution having an initial mole ratio of lead to acetate of from greater than 0.5:1 to about 1:1 and a lead concentration of from about 1 to about 10 weight percent with carbon dioxide gas in an amount effective to reduce the lead to acetate mole ratio to 0.5:1 by precipitating high purity basic lead carbonate;
(b) mixing said lead acetate solution and gas under agitation and at a temperature in the range of from about 50° to about 70° C., at atmospheric pressure and for a time sufficient to precipitate high purity basic lead carbonate and reduce the lead to acetate mole ratio to 0.5:1;
(c) filtering said high purity basic lead carbonate to separate the high purity basic lead carbonate from the remaining lead acetate solution to form a high purity basic lead carbonate filter cake;
(d) then contacting said remaining lead acetate solution with carbon dioxide gas at a pressure in excess of about 50 p.s.i.g., at a temperature of from about 40° to about 100° C. and for a time sufficient to precipitate high purity normal lead carbonate;
(e) maintaining said pressure in excess of about 50 p.s.i.g.;
(f) filtering said high purity precipitated normal lead carbonate under said pressure to separate the high purity normal lead carbonate from the remaining acetic acid solution and to form a high purity normal lead carbonate filter cake.

* * * * *